Nov. 22, 1955          H. L. GLOVER          2,724,147
               GROUND CORK GASKET MOLD
Filed Dec. 5, 1951                           2 Sheets-Sheet 1
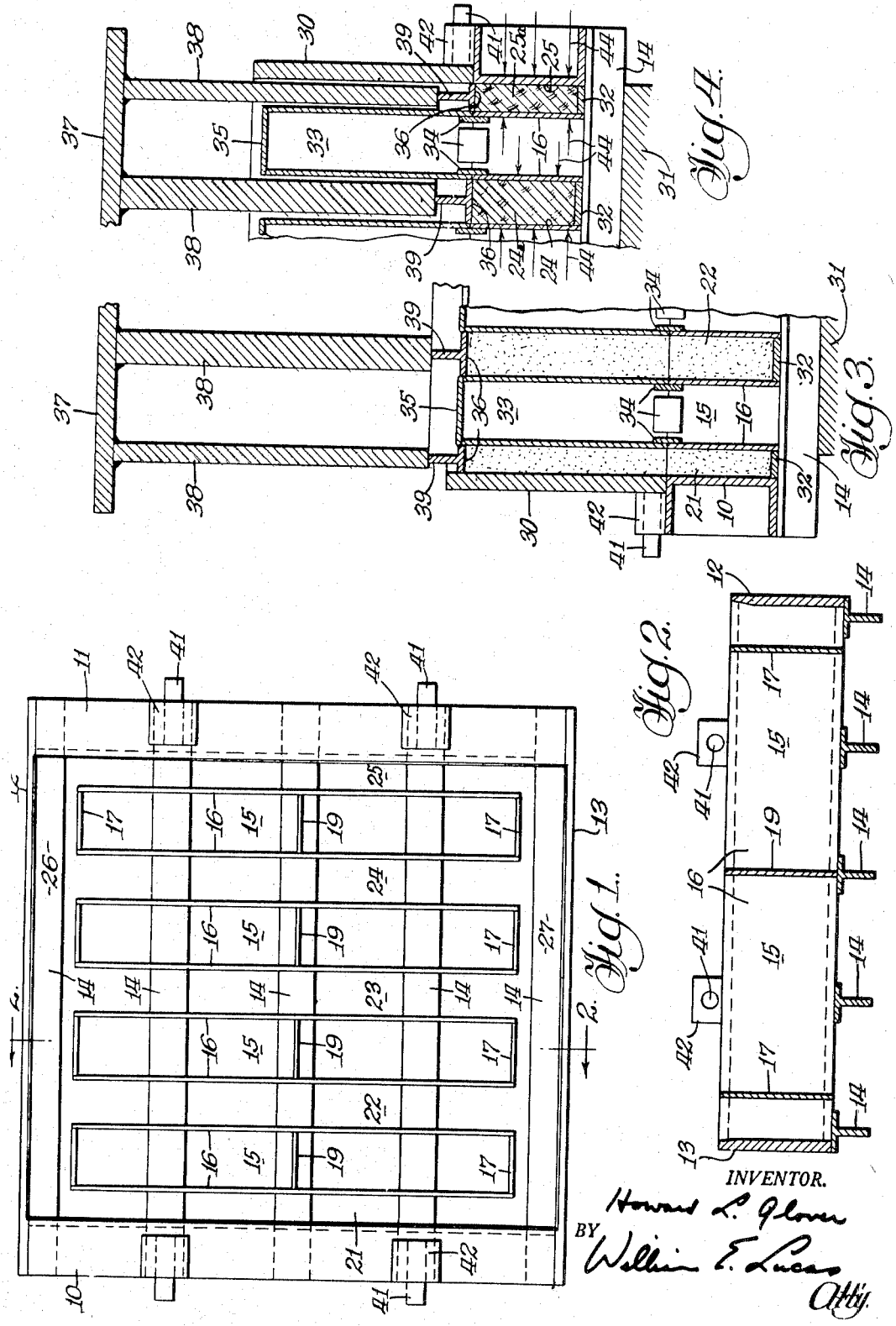
INVENTOR.
Howard L. Glover
BY William E. Lucas
Atty.

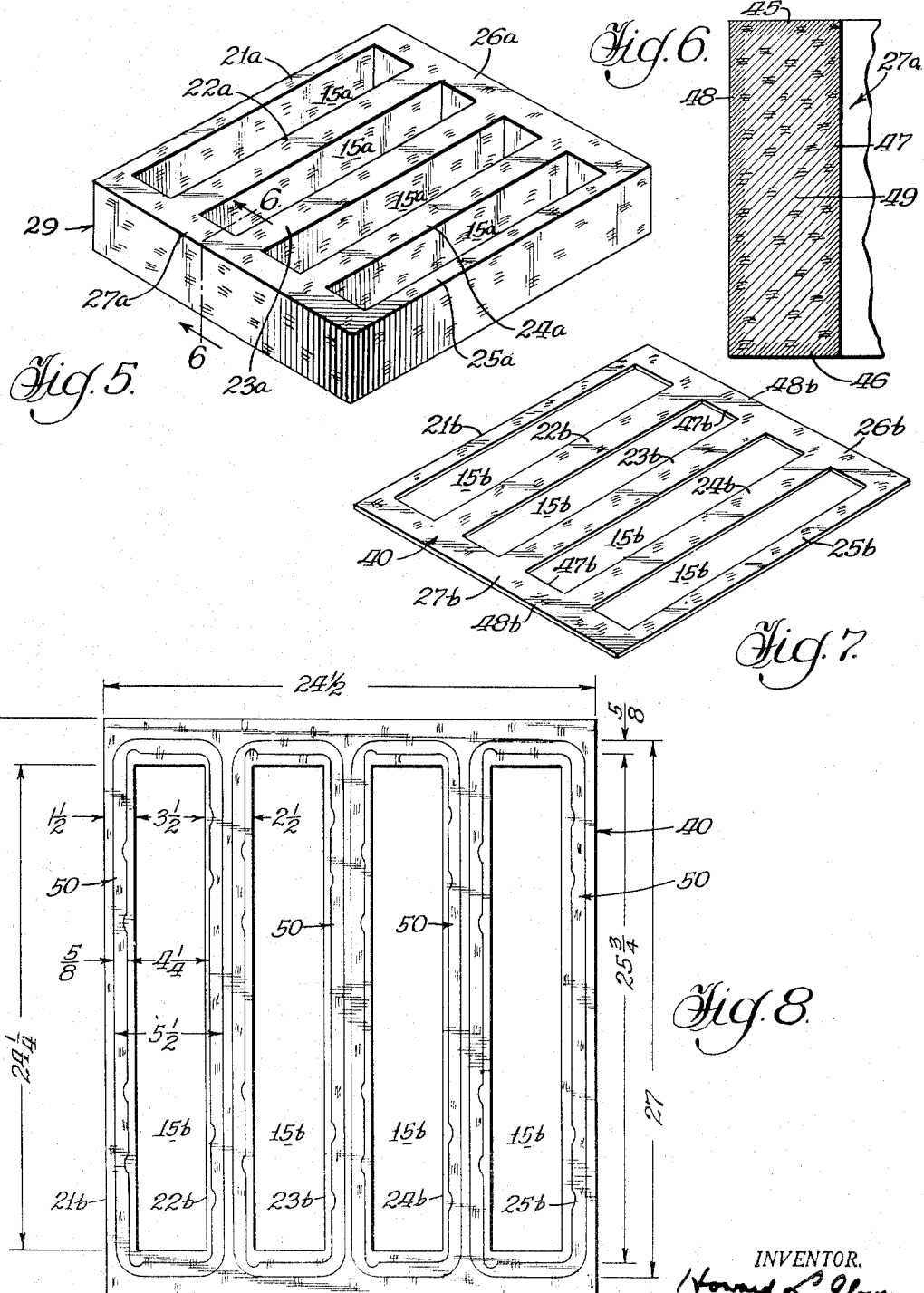

United States Patent Office 2,724,147
Patented Nov. 22, 1955

2,724,147

GROUND CORK GASKET MOLD

Howard L. Glover, Chicago, Ill.

Application December 5, 1951, Serial No. 260,040

5 Claims. (Cl. 18—34)

This invention relates to cork gaskets. In my copending United States patent application Serial Number 205,890, I have disclosed and claimed certain unique features of the methods employed in manufacturing such gaskets. The present specification is a division of the prior application, and is directed to the novel features of the equipment which I have developed for this purpose.

While it is well known that cork gaskets have been employed in almost every conceivable type of machinery and are very widely used in the automobile industry for sealing crank cases, valve covers and other parts, the manufacturing methods required by the types of apparatus heretofore available for the manufacture of these gaskets have been extremely wasteful, both as to time required and as to material consumed. The inevitable result has been that the manufacture of gasekts by conventional apparatus has been unnecessarily expensive.

It is therefore the primary object of the present invention to provide unique apparatus which permits or facilitates new and different techniques in the manufacture or cork gaskets. In pursuance of this general object, it is the primary aim of the invention to provide apparatus capable of manufacturing gaskets which are of equal or superior quality to those manufactured heretofore, yet to reduce the time required by the manufacturing processes substantially, and to produce gaskets by the use of only a fraction of the raw material heretofore required.

These objects are accomplished in the present invention by employing novel equipment and unusual manufacturing methods, the combination of which has been found by actual test to require only about one-third of the raw material required by conventional processes, and to nevertheless produce gaskets in approximately half of the time heretofore required, with a corresponding reduction in labor costs. Obviously this gives rise to important increases in production in a manufacturing plant of any given size, or makes it possible to produce a given daily output of gaskets with far less equipment and manpower than heretofore required.

The teachings of the present invention are applicable to almost all of the larger types of cork gaskets, particularly those intended to seal the marginal edges of a crank case, oil housing, valve rocker arm cover, or other similar housing. The invention is applicable, however, to any of the larger gaskets having an open center portion therein.

The principles of this invention will be discussed in connection with equipment specifically designed for producing a type of gasket which is a typical example of one of the uses to which cork gaskets are ordinarily put: namely, a gasket for a valve rocker arm cover of an automobile engine. Before describing the apparatus, however, it may be advisable to point out that the present invention contemplates manufacture of gaskets formed of ground cork with a binder such as glue or thermosetting plastic compressed and baked until the entire mass has solidified, and then sliced into thin sheets of gasket material. Obviously, such material must be molded into a fairly rigid yet resilient body consisting primarily of cork so that it has the compressibility requisite for use as gasket material, yet having a sufficient tensile strength so that it may be handled and put in place without undue likelihood of damage.

Such a body of compressed cork has extraordinary thermal insulating properties, which have heretofore imposed serious difficulties in manufacture and caused much waste of material, largely due to the fact that with conventional equipment it has been impractical to achieve sufficient heat penetration to produce uniformly baked molded cork blocks of any considerable thickness. In practice, it appears that a thickness of from two to three inches is about the practical limit, since while it is essential that the cork body be adequately baked throughout, it is nevertheless of equal importance that its design be such that this baking may be accomplished within a reasonable length of time, and without undue charring of the exterior surface.

The apparatus here disclosed takes advantage of the fact that in almost all conventional types of gaskets required for modern machines, particularly automobiles, the gaskets themselves are of what may be termed "marginal shapes" having an open center of an area greatly exceeding the actual surface area of the gasket. In such shapes, the actual width required at any portion of the gasket seldom exceeds one inch and is often considerably less. It is therefore a proposal of the present invention to provide molding equipment so designed and constructed as to mold relatively thick bodies of cork material, yet to mold a cork body in a form which we may conveniently refer to as a "frame," having a number of openings through the body separated by integral cork sections. In practice, the individual sections of the frame are preferably of considerably greater thickness than their width. By this expedient it is entirely feasible to mold thicknesses up to several times the prior practical limits, since the cork may be baked by introducing hot air into ducts passing through the openings therein, as well as by applying exterior heat. Thus the body of cork is not heated primarily from the top and bottom surfaces thereof, but is baked by heat transmitted laterally inward from the outside of the mold and at the same time transmitted laterally outwardly from the core through air ducts passing therethrough. This lateral heating of the cork during the baking process is of extreme importance in that it permits the construction of molding equipment wherein the thickness of the cork body is limited only by the capacity of the presses employed in filling the mold, so that a relatively large number of individual gaskets may be obtained from each block of the molded cork.

The present apparatus, by affording much greater thickness of the molded cork, also allows the gaskets sliced therefrom to be formed entirely of what may be termed the "core" portion of the compressed cork body with a much smaller percentage of scraps than in the case of thinner material. This follows from the recognized fact that the surfaces of a molded cork body are somewhat hard and brittle, and lack flexibility, resiliency and tensile strength requisite for a high quality gasket. In the thicker frames made possible by this invention, this surface material is a relatively small percentage of the whole, and by far the larger part of the frame is of first quality gasket material, of proper color and texture, and possessing all of the strength and resiliency of the cork.

The present form of the invention is illustrated herein with apparatus employed for making automobile valve rocker arm covers, and equipment specifically designed for this purpose is illustrated in the drawings of this specification wherein:

Figure 1 is a plan view of a typical mold employed to practice the present method of manufacture;

Figure 2 is a transverse sectional view taken substantially on the plane of the line 2—2 of Figure 1;

Figure 3 is a fragmental cross sectional view of the mold and its coacting parts as they are assembled in a press prior to compression of a mass of ground cork and binder therein;

Figure 4 is a sectional view similar to Figure 3, showing the parts of the mold after the cork body therein has been properly compressed;

Figure 5 is a perspective view of a baked cork frame as contemplated by the present invention;

Figure 6 is a fragmental detail cross sectional view taken substantially on the plane of the line 6—6 of Figure 5; and illustrating the relationship between the relatively brittle crust of the cork and the resilient core thereof;

Figure 7 is a detail perspective view of an individual sheet of cork sliced from a frame such as illustrated in Figure 5; and Figure 8 is a plan view of a sheet such as illustrated in Figure 7 after the gaskets have been die cut therefrom.

The mold employed herein consists of a main metal frame comprising channel irons 10 and 11 at the opposite sides joined by flat metal plates 12 and 13 at the ends of the mold. The mold is open at the top and bottom (Figure 2), but is provided with a multiplicity of cross bars 14 which, as illustrated, are T-shaped in cross section and extend between the side channels 10 and 11. The mold is provided with four hollow air ducts 15, each having opposite side walls 16 standing upright on the cross bars 14 and welded thereto, with the opposite ends of the side walls joined by end plates 17. As illustrated, the air ducts are provided with central partitions 19 which space the walls of each duct apart from each other and provide a reinforcement for these walls when the powdered cork material is compressed within the mold. The walls 16 and 17 of these ducts 15 are adjacent but spaced from the exterior wall members 10, 11, 12 and 13 of the mold and are similarly spaced from each other, so that the mold is divided into a plurality of sections 21, 22, 23, 24 and 25, which run the full length of the mold in one direction, and are united at each end by the transverse sections 26 and 27. Thus, when the pulverulent cork from which the cork frame is to be made is inserted in the mold and compressed, the sections 21 to 27 form into an integral solid frame of cork, while the air ducts 15 form hollow spaces or openings therein.

The manner in which the molds are utilized in compressing the cork body is best illustrated in connection with Figures 3 and 4, wherein it will be seen that the frame of the mold, that is, the channels 10 and 11, end plates 12 and 13, and the cross bars 14 are positioned on the bed 31 of a hydraulic press. The open bottom of the mold is closed by a perforated plate 32, which is of generally rectangular shape, having its outer dimensions fitting loosely between the channels 10 and 11 at the sides and between the plates 12 and 13 at the ends. This plate 32 has four apertures formed therein to correspond with the size and shape of the air ducts. Thus, this plate may be inserted in the mold to rest on the cross bars 14 as illustrated. The open top of the mold is preferably provided with an extension to increase the capacity thereof. Conveniently, this extension may be in the form of a rectangular wall 30 which is preferably of a size corresponding to the length and width of the mold, and of a height sufficient to extend the effective height of the mold to about three times the height of the side channels and end plates thereof. Four removable blocks 33 are also positioned in the four air ducts 15, so that the height of the plates 16 and 17 is increased accordingly. Each of the blocks 33 comprises side and end walls corresponding to the walls 16 and 17, and has inwardly offset mounting flanges 34 so that they maintain themselves in position when telescoped into the upper ends of the air ducts. The tops of the blocks 33 are closed by flat plates 35 so that when the top of the mold is open it may be conveniently filled with powdered cork material, which will be prevented from flowing through the air ducts 15 by the blocks, but will be allowed to accumulate in the sections 21—27 of the mold and the portions of the mold extension disposed thereabove.

A top plate 36 of size and shape corresponding to the bottom plate 32 is then placed in position on the mold and the bed 31 of the press is raised until the top plate is engaged by a ram 37 which forces the top plate to exert pressure on the cork within the mold. The ram 37 has downwardly extending flanges 38 corresponding to the shape of the top plate 36. These flanges bear directly on reinforcing flanges 39 welded to the top plate 36, so that as the bed 31 of the press moves upwardly, the body of cork will be compressed from the position shown in Figure 3 to that of Figure 4. At this point, the entire mass of the ground cork and its binder has been compressed into a cork frame corresponding in size and shape to the sections 21—27 of the mold, and represented in Figure 4 by the solid cork sections 24a and 25a. When the cork has thus been compressed it is entirely within the frame of the mold, so that the auxiliary wall or extension 30 of the mold may be removed and the top plate of the mold locked in place. To this end, the extension wall 30 is first manually lifted, and the top plate 36 is locked in position by driving the four locking pins 41 inwardly through the mounting brackets 42, until their inner ends overlie the edges of the top plate 36. The press may then be opened and the extension blocks 33 removed. The molds, with the cork held in compressed condition therein, will then be in condition for baking.

It is to be noted that when the blocks 33 are removed from the mold the air ducts 15 are left entirely open from top to bottom, so that hot air may be introduced into these ducts during the baking process, so that heat will be applied to the cork frame from the inside thereof as well as from the outside. That is, each of the individual sections of the mold (represented in Figure 4 by sections 24 and 25) will be heated primarily by heat entering the mold laterally as illustrated by the arrows 44 of the figure. This brings about quick penetration of the heat into the central portion of the cork even in a relatively thick cork frame, since the depth to which the heat must penetrate is never greater than half the distance between these vertical surfaces, which may be quite close together irrespective of the height of the mold. Thus, the time required for baking the frames is not dependent on the thickness of the cork frame to be produced. It follows that frames of any desired thickness may be employed without unduly increasing the time required for adequate baking thereof.

When the baking of the cork frame is completed, the molds are placed in a cooling chamber and blowers are provided to circulate relatively cool air over the exterior surfaces of the molds and through the air ducts thereof. Here, again, the presence of the air ducts greatly increases the efficiency of heat transfer during the cooling operation in the same manner as heretofore described, and therefore permits the molds to be rapidly cooled to a temperature at which the ground cork and its binder becomes "set"; that is, when they become a relatively rigid, stable mass which is not thereafter unduly subject to swelling, buckling or other distortion. At this time the mold is cool enough for handling and the frame may be removed therefrom for further processing.

The "frame" or body 29 of cork (Figure 5) is taken from the mold by removing the pins 41 and the top plate 36 and forcing the bottom plate 32 upwardly to force the frame out of the mold. The completed frame 29 is an integral unitary body of cork as illustrated, having a plurality of relatively large elongated central openings 15a corresponding to the air ducts 15 and consisting of sections 21a, 22a, 23a, 24a and 25a integral with and extending between end sections 26a and 27a. These sections, of course, correspond with the sections 21 to 27 of the mold.

It has heretofore been pointed out that in the baking process the exterior surfaces of the cork body becomes somewhat brittle and lack the resiliency required for the production of highest quality gaskets. This condition is illustrated in Figure 6 wherein it will be seen that the section 27a of the frame has an outer crust comprising upper and lower layers 45 and 46 with inside and outside layers 47 and 48, all of which surround the inner resilient core portion 49 which is best suited to the production of high quality gaskets. By practicing the present invention, however, it is possible to greatly reduce the amount of raw material required for the manufacture of a given number of gaskets and at the same time to produce gaskets of the highest possible quality employing only the choice portions of the cork having the desired degree of strength, flexibility and rigidity. This is accomplished by first trimming one flat surface of each of the frames (for example, removing the top crust layer 45) and then slicing the remainder of the frame into relatively thin flat slices 40 as illustrated in Figure 7, which slices are thereafter die cut into individual gaskets as illustrated in Figure 8.

It is to be noted that when the upper layer of crust 45, for example, has been trimmed off, repeated slices taken from the flat surface of the frame shown in Figure 5 will appear as thin resilient sheets having sectional strips 21b to 25b extending between and integral with sectional strips 26b and 27b at the ends. These strips will have, however, at their inner and outer edges, narrow portions of crust 47b and 48b which have less resiliency that required for the best type of cork gasket. It is therefore the practice of the present invention to die cut the individual gaskets 50 from the central or core portion of each of the sectional strips as illustrated in Figure 8. Thus, each endless gasket is die cut from around one of the apertures 15b of the sheet 40, but the parts of the frame and gasket are so proportioned that the gasket in each case is somewhat larger than the aperture and is spaced from the inner and outer edges of the sectional strips at all points. Thus, the gaskets 50 utilize only the core portion of the frame which has the greatest strength, resiliency and compressibility, and is the most suitable for its required purpose. At the same time, it is to be noted that the present teachings require only about half of the raw material that would be required by a solid cork body of the same exterior dimensions, since with the dimensions shown, the cubic capacity of the openings through the frames is approximately one-half of the total volume of the mold.

From the above it should be apparent that the molding equipment disclosed herein facilitates the accomplishment of several important advances in the gasket making art. In the first place, it will be readily apparent that by the use of this equipment cork frames or slabs of any given thickness may be produced with much less raw material than heretofore required. (Actually, the utilization of molds employing the large internal air ducts shown results in production of a frame of a given thickness with only about one-half of the material necessary for production of the same thickness of slab by utilization of conventional molding equipment.) These relatively large air ducts through the mold also provide a marked increase in the heat transfer efficiency of the mold, with the result that the cork slabs required for a given number of gaskets may be processed in somewhat less than half of the time required by the best conventional molding equipment known to the applicant. With all of this, the present molds also permit a great increase in the thickness of the cork, resulting in still further advantages in production and savings in costs. This is primarily because the gaskets can utilize only the core portion of the cork which has the highest tensile strength, resiliency and compressibility. The more brittle exterior layer is waste. In a thin slab, the brittle top and bottom layers represent a very considerable proportion of the entire mass. This percentage is obviously much less when a thick frame is used.

The unique molding equipment disclosed herein nevertheless affords considerable dimensional leeway in the production of gaskets, since with a frame of the dimensions shown, for example, a manufacturer may produce quantities of the precise form of gasket illustrated, but may convert to another similar gasket having substantially the same dimensions but different detailed configuration merely by the provision of another set of cutting dies without the need of any changes whatsoever in the molding equipment. This is of considerable advantage in production of gaskets for automotive manufacturers, for example, wherein changes from one yearly model to the next ordinarily involve only very small detailed changes in shape or only very small changes in dimensions, and wherein the changes in overall dimensions from year to year are seldom enough to exceed the limits provided in a mold producing frames of substantially the proportions shown herein.

The equipment here disclosed is a specific embodiment of the invention used in the applicant's present manufacturing process, but it should be understood that the precise forms of apparatus shown herein are illustrated by way of example rather than in limitation of the disclosure hereof, and that the invention is of sufficiently broad scope to include any modifications of the apparatus coming within the terms of the appended claims.

Having thus described my invention, what I claim as new and desire to secure by United States Letters Patent is:

1. A gasket frame mold comprising, in combination, a pair of parallel, vertical side walls and a pair of parallel, vertical end walls, each of said walls consisting of a metallic plate joined to an adjacent wall at each end thereof, said plates defining a generally rectangular, rigid exterior mold frame with an open top and open bottom; a plurality of rigid metallic beams extending across the open bottom of the mold frame in spaced relationship to each other, with the opposite ends of each of said beams secured to the metallic wall plates; a plurality of internal vertical metal plates of substantially the same height as the exterior frame plates extending partially across the interior of the frame but terminating short of the exterior walls thereof, said internal plates being secured to and supported by the cross beams and being arranged in pairs joined by end plates at the opposite ends thereof and forming a plurality of individual, separate, hollow air ducts each extending from the bottom of the mold frame to the top thereof, with the individual ducts spaced from each other a distance less than the height thereof whereby said ducts divide the interior of the mold into a plurality of thin, parallel, longitudinal sections interconnected at the opposite ends thereof by thin, transverse sections extending thereacross; together with an exterior mold extension comprising opposite pairs of parallel walls extending upwardly from the side and end walls, and a plurality of individual, separately removable blocks each corresponding in size and shape to one of the air ducts through the mold, with each of the said blocks carried on and supported by said duct; together with a pair of apertured top and bottom plates closing the spaces between the air ducts and the exterior walls of the frame and sealing the mold frame at the top and bottom thereof.

2. A gasket frame mold comprising, in combination, a pair of parallel, vertical side walls and a pair of parallel, vertical end walls, each of said walls consisting of a metallic plate joined to an adjacent wall at each end thereof, said plates defining a generally rectangular, rigid exterior mold frame with an open top and open bottom; a plurality of rigid metallic beams extending across the open bottom of the mold frame in spaced relationship to each other, with the opposite ends of each of said beams secured to the metallic wall plates; a plurality of internal vertical metal plates extending partially across the interior of the frame but terminating short of the exterior walls thereof, said internal plates being arranged in pairs joined by end plates at the opposite ends thereof and forming a plurality of individual, separate, hollow air ducts spaced from each other whereby said ducts divide the interior of the mold into a plurality of parallel, longitudinal sections interconnected at the opposite ends thereof by transverse sections extending thereacross; together with an exterior mold extension comprising opposite pairs of parallel walls extending upwardly from the side and end walls, and a plurality of individual, separately removable blocks each corresponding in size and shape to one of the air ducts through the mold, with each of the said blocks carried on and supported by said duct; together with a pair of apertured top and bottom plates closing the spaces between the air ducts and the exterior walls of the frame and sealing the mold frame at the top and bottom thereof.

3. A gasket frame mold comprising, in combination, a generally rectangular, rigid exterior mold frame with side and end walls, an open top and a plurality of individual, separate, hollow air ducts spaced from each other and extending from the bottom of the mold frame to the top thereof; together with an exterior mold extension comprising an open frame having opposite pairs of parallel walls extending upwardly from the side and end walls of the frame, and a plurality of individual, separately removably extensions of the air ducts; said extensions each corresponding in size and shape to one of said ducts, with each of the said extensions carried on and supported by said duct; together with a top plate slidably fitted within the walls of the exterior mold extension; said top plate having apertures fitting around the extensions of the air ducts whereby the top plate extends between said ducts and the exterior walls of the frame, to seal the mold at the top thereof and to support the removable duct extensions as the top plate is lowered into the mold.

4. A gasket frame mold comprising, in combination, a rigid exterior mold frame with an open top and a plurality of individual, separate cores each extending from the bottom of the mold frame to the top thereof, with the individual cores spaced from each other; together with an exterior mold extension comprising walls extending upwardly from the mold frame walls, and a plurality of individual, separately removable core extensions each mounted upon and corresponding in size and shape to one of the aforementioned cores in the mold; together with an apertured top plate closing the spaces between the cores and the exterior walls of the mold and supporting the upper ends of the core extensions as the top plate is moved from the mold extension into the mold frame.

5. A gasket frame mold comprising, in combination, a rigid exterior mold frame with an open top and a plurality of individual, separate cores each extending from the bottom of the mold frame to the top thereof, with the individual cores spaced from each other; together with an exterior mold extension comprising walls extending upwardly from the mold frame walls, and a plurality of individual, separately removable core extensions each mounted upon and corresponding in size and shape to one of the aforementioned cores in the mold; together with aligning and centering means adapted to support said core extensions on said cores.

References Cited in the file of this patent

UNITED STATES PATENTS

| | | |
|---|---|---|
| 804,423 | Miller | Nov. 14, 1905 |
| 1,365,753 | Vought | Jan. 18, 1921 |
| 1,566,898 | McManus | Dec. 22, 1925 |
| 1,566,904 | McManus | Dec. 22, 1925 |
| 1,830,225 | Dance | Nov. 3, 1931 |
| 2,136,734 | Denman | Nov. 15, 1938 |
| 2,518,504 | Stott | Aug. 15, 1950 |

FOREIGN PATENTS

| | | |
|---|---|---|
| 216,970 | Germany | Mar. 31, 1909 |